A. J. KUSTERER & C. SANDERS.
SHELL BOX MAKING MACHINE.
APPLICATION FILED AUG. 15, 1914.
1,218,417.
Patented Mar. 6, 1917.
21 SHEETS—SHEET 4.
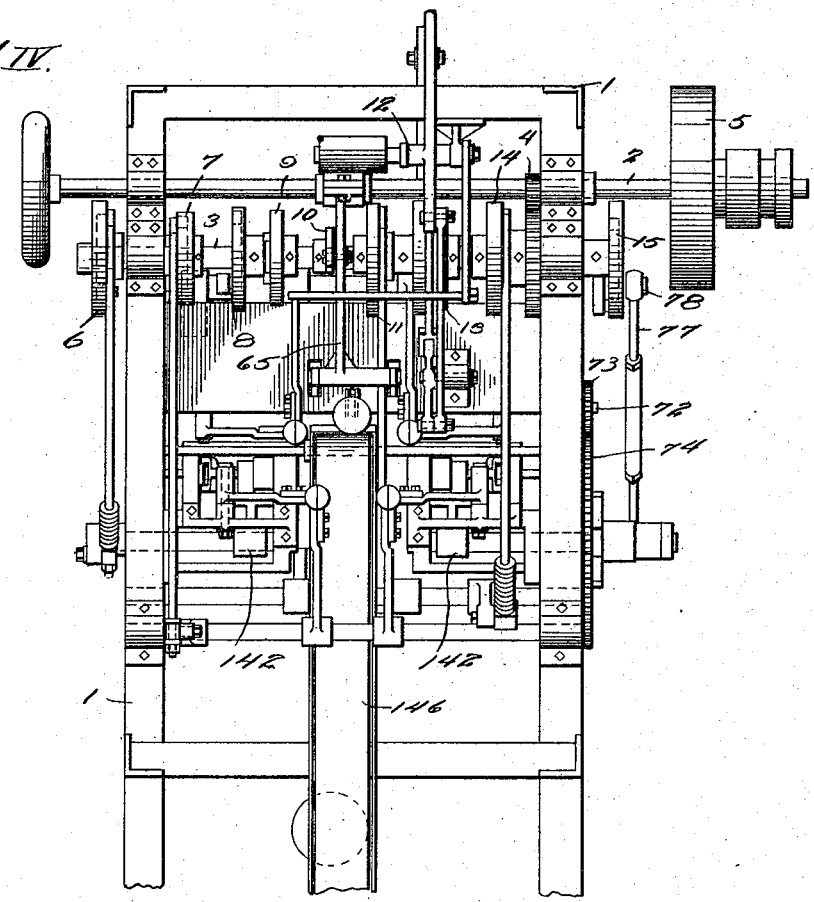
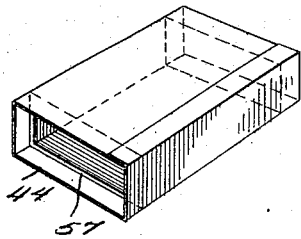
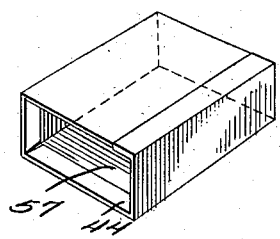
Witnesses
Inventors
Aloysius J. Kusterer and
Charles Sanders,
By Mason Fenwick Lawrence,
Attorneys

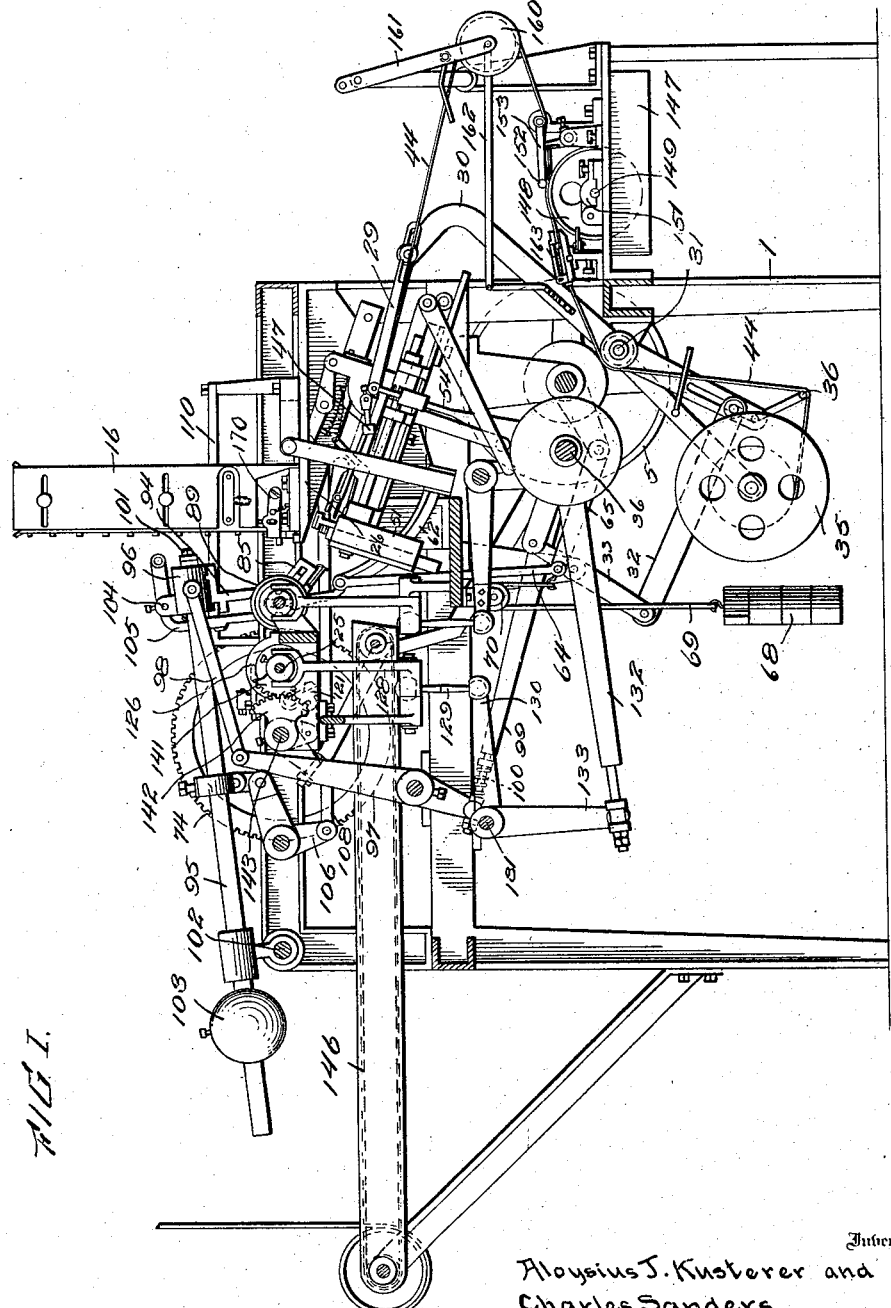

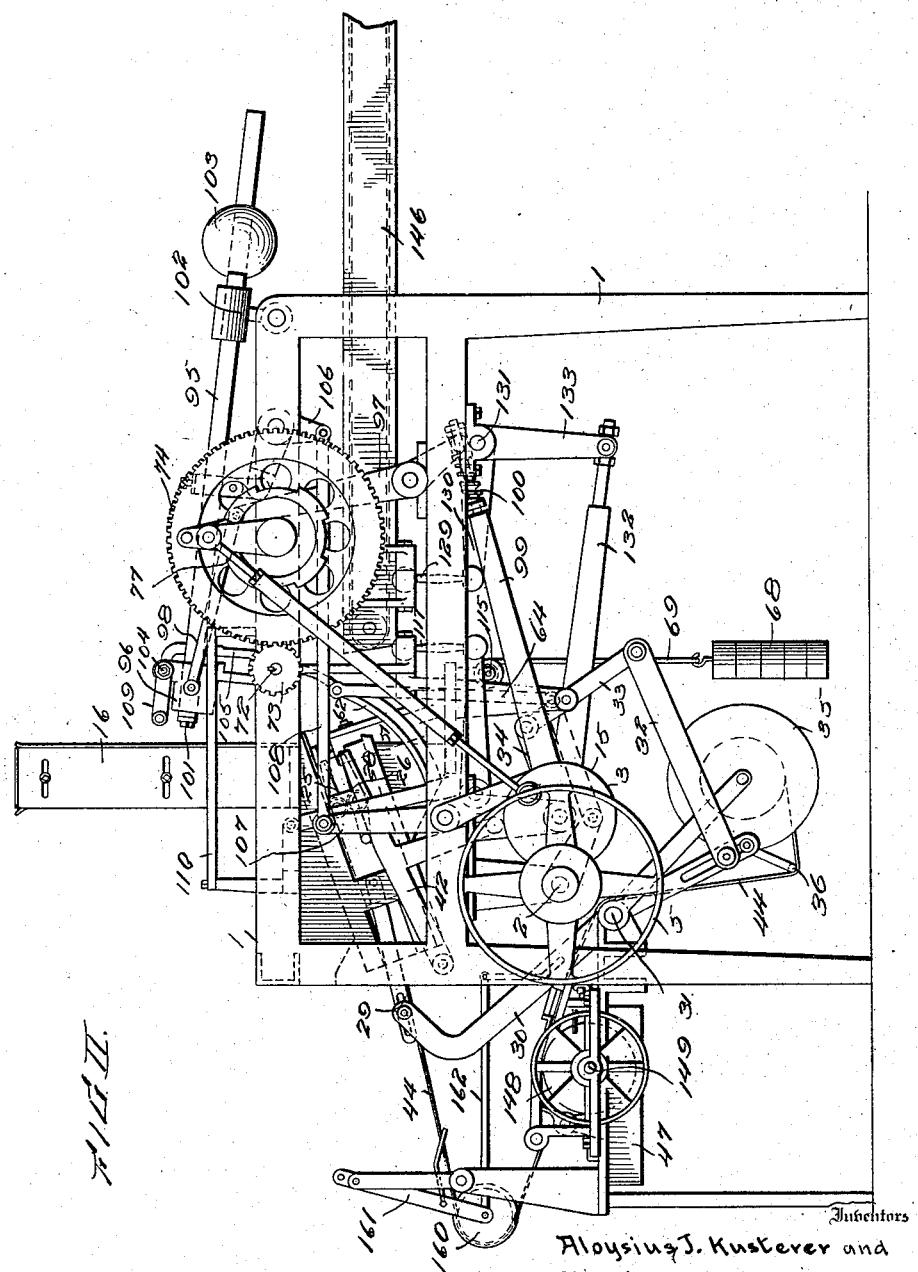

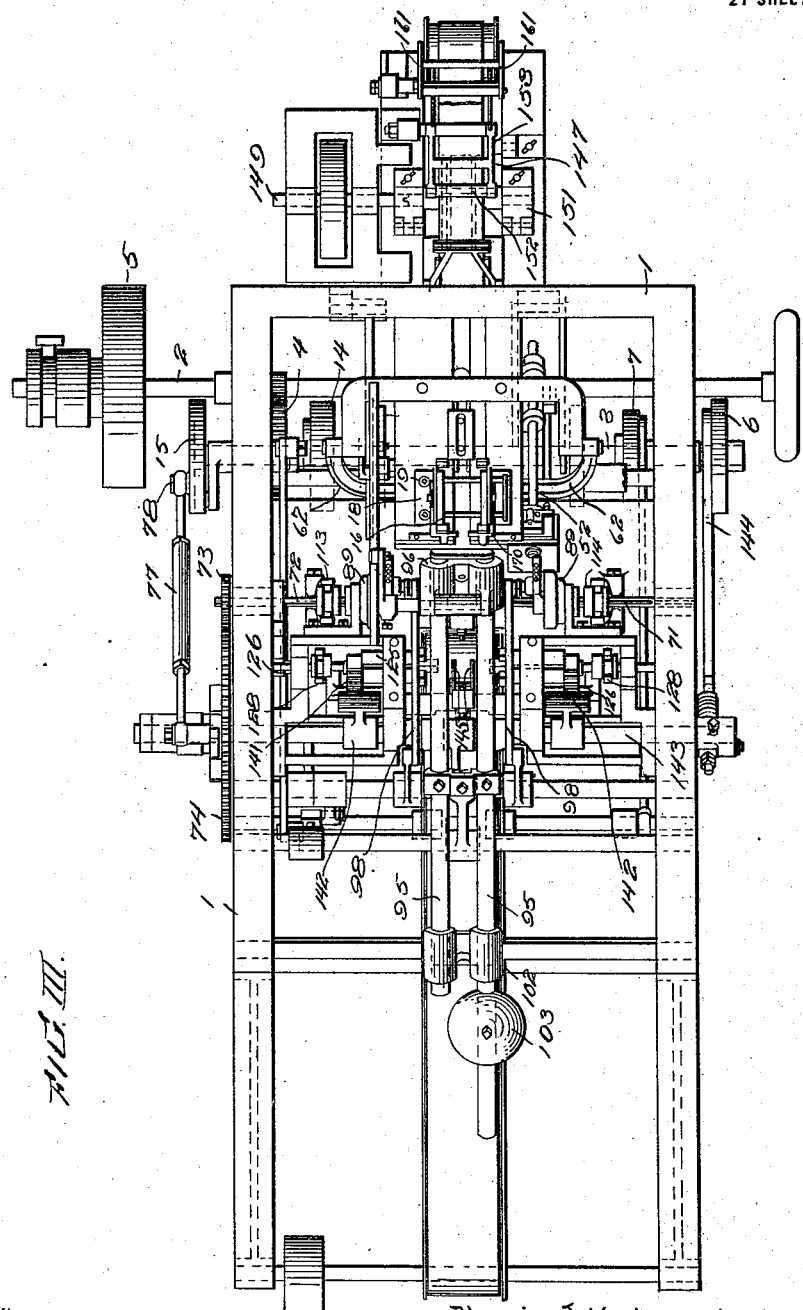

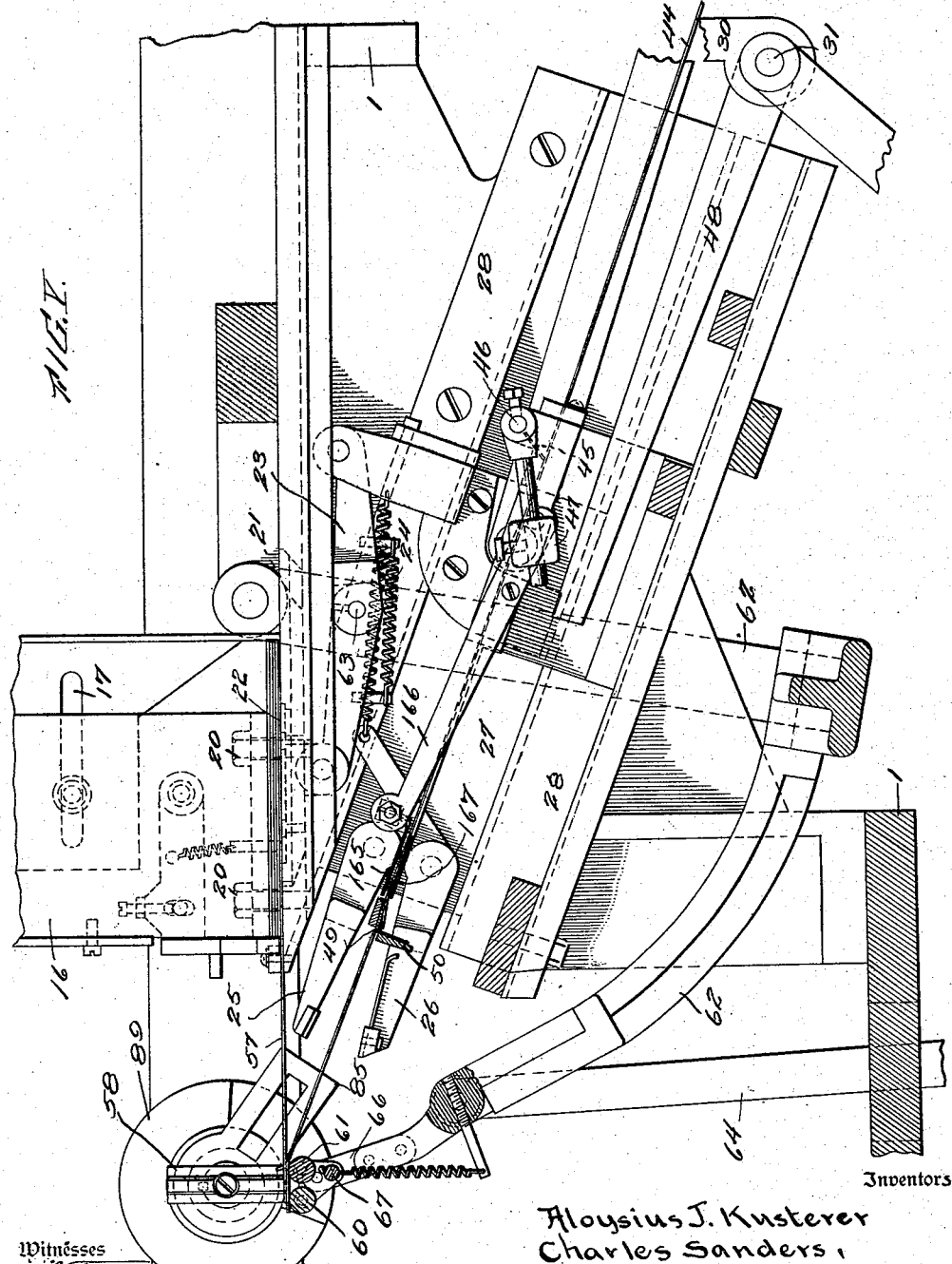

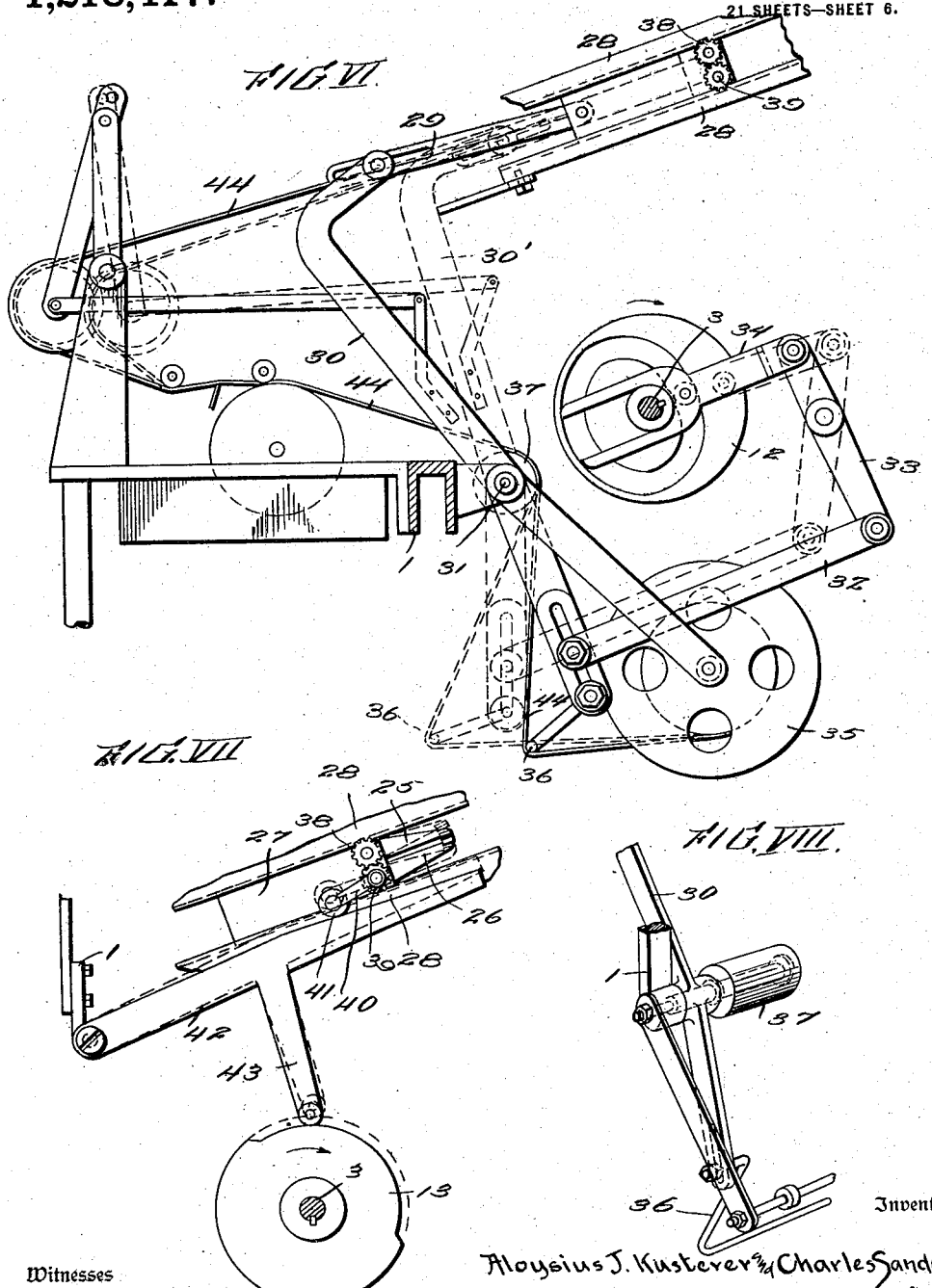

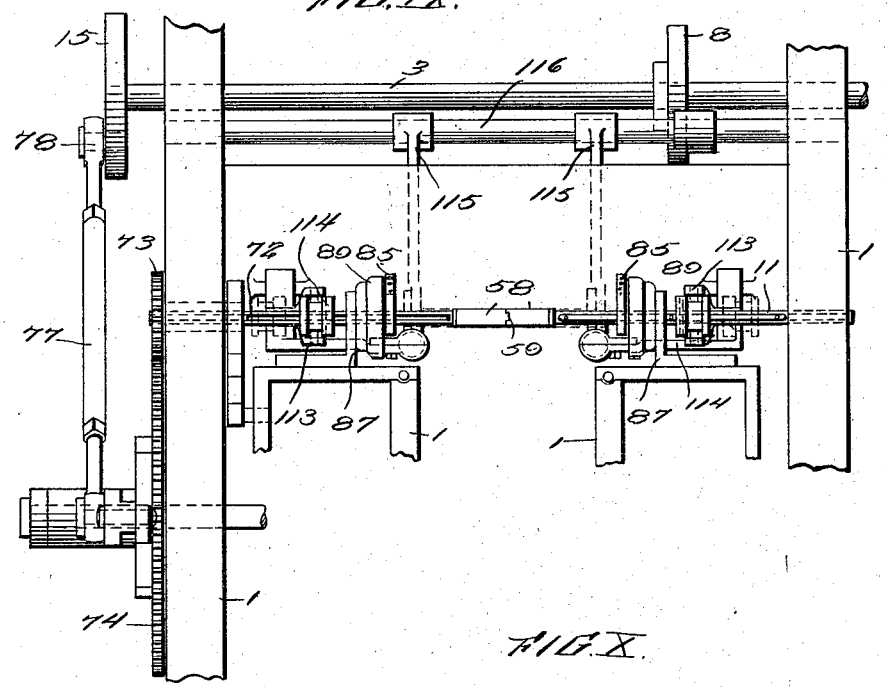
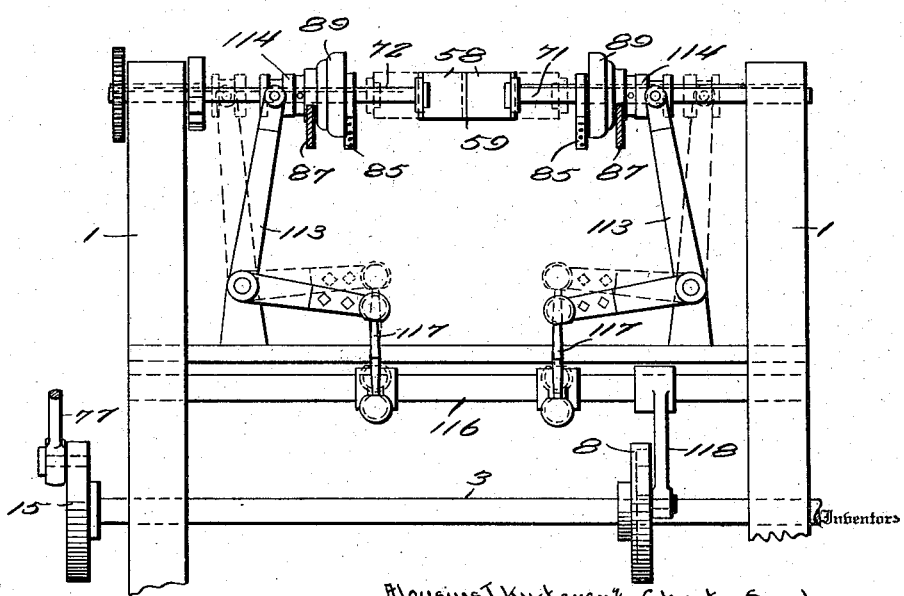

A. J. KUSTERER & C. SANDERS.
SHELL BOX MAKING MACHINE.
APPLICATION FILED AUG. 15, 1914.
1,218,417.
Patented Mar. 6, 1917.
21 SHEETS—SHEET 8.
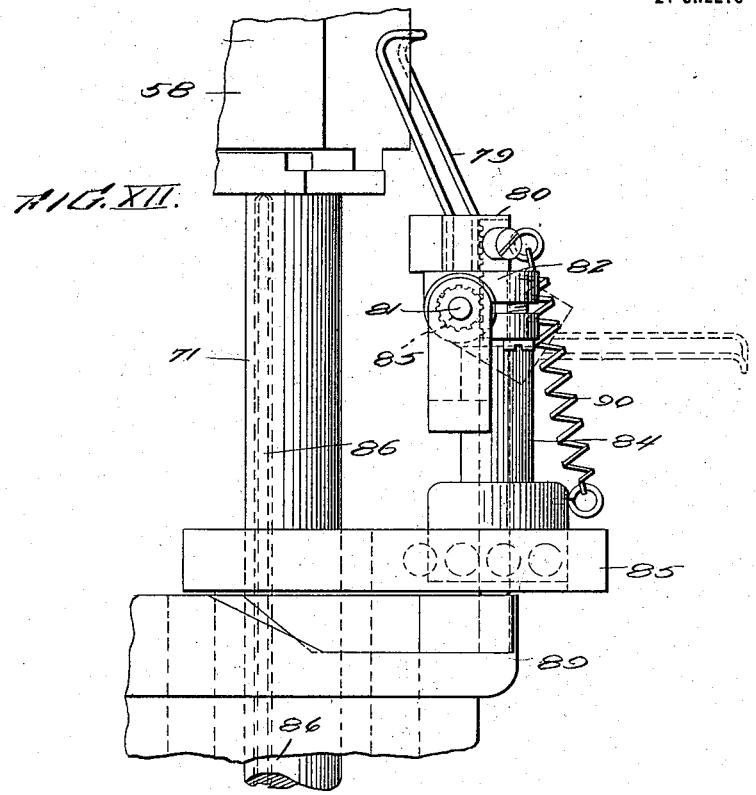
FIG. XII.
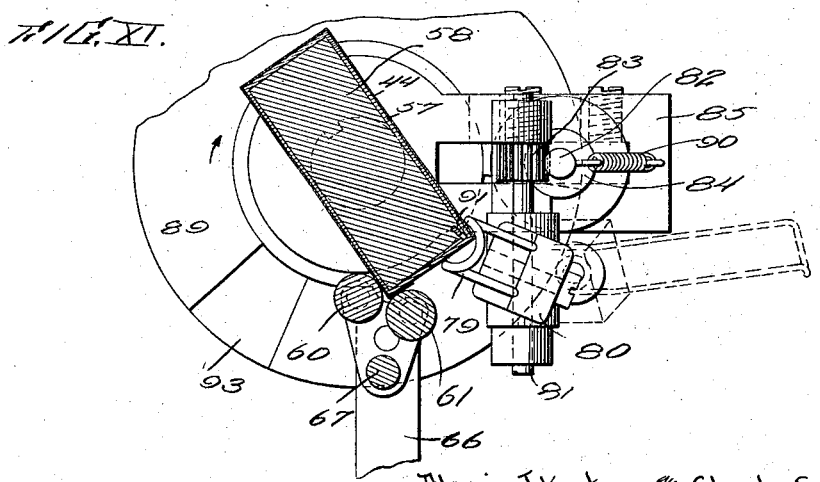
FIG. XI.
Inventors
Aloysius J. Kusterer and Charles Sanders,
By Mason Fenwick Lawrence,
Attorneys
Witnesses

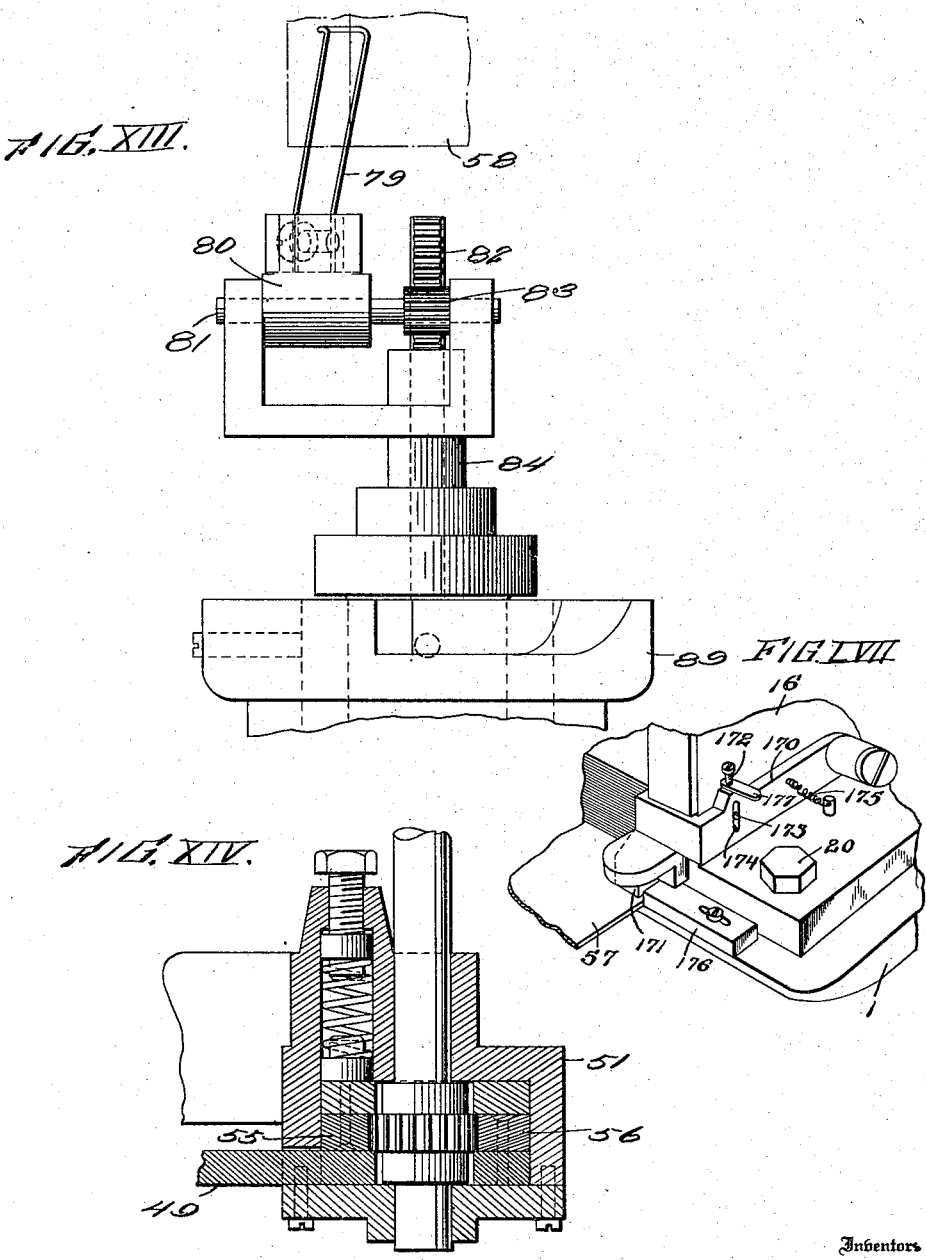

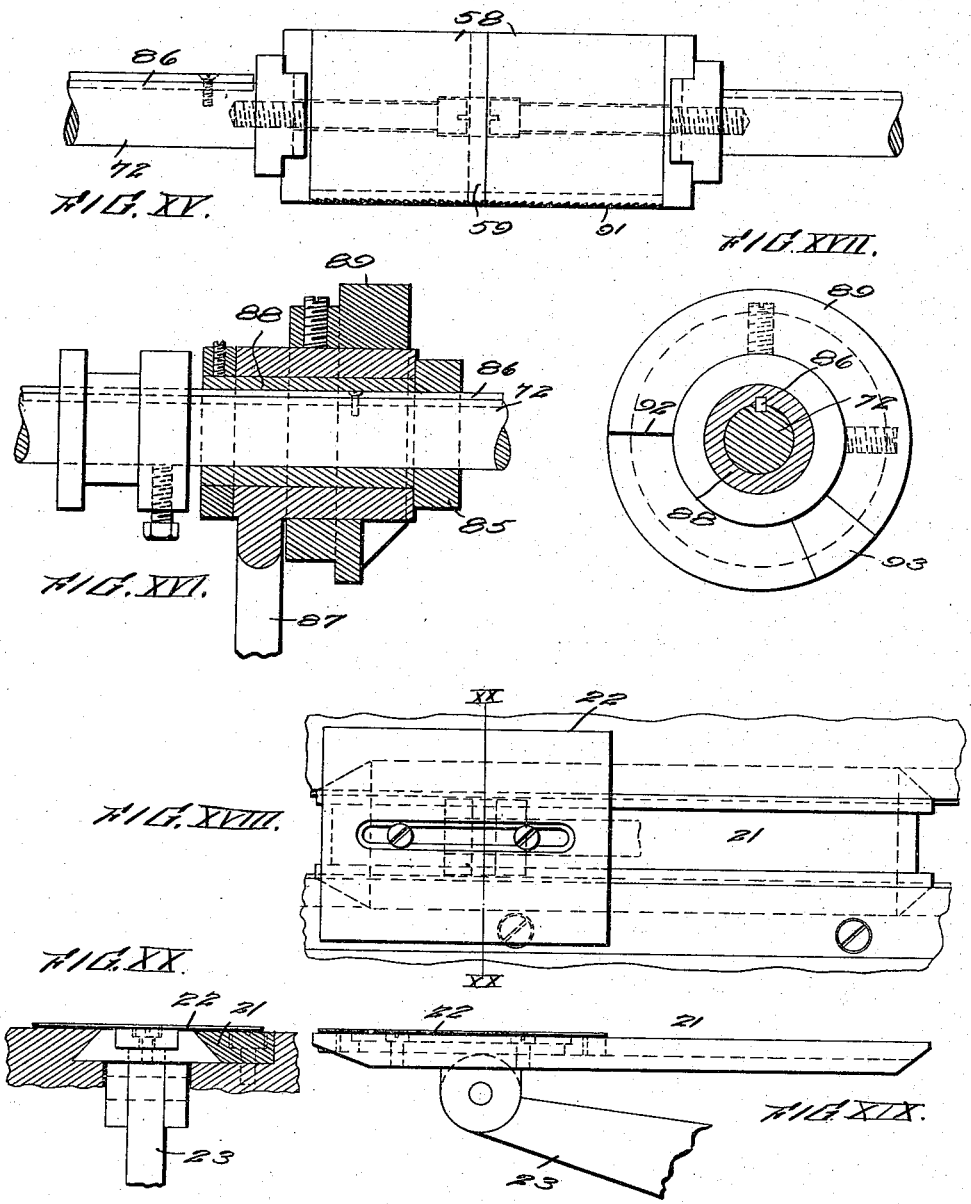

A. J. KUSTERER & C. SANDERS.
SHELL BOX MAKING MACHINE.
APPLICATION FILED AUG. 15, 1914.
1,218,417.
Patented Mar. 6, 1917.
21 SHEETS—SHEET 11.
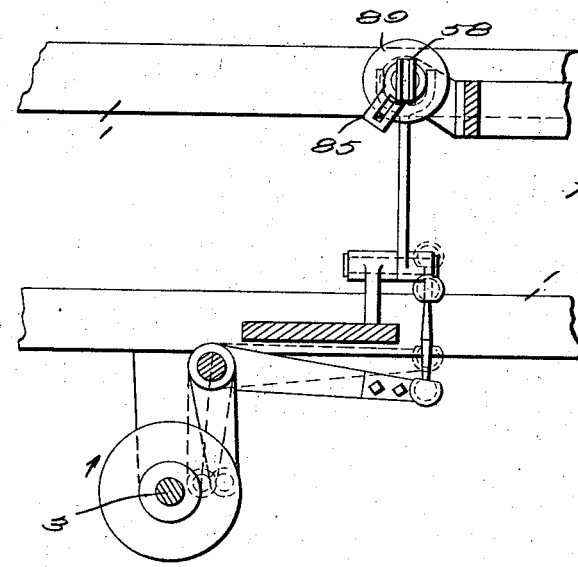
FIG. XXI.
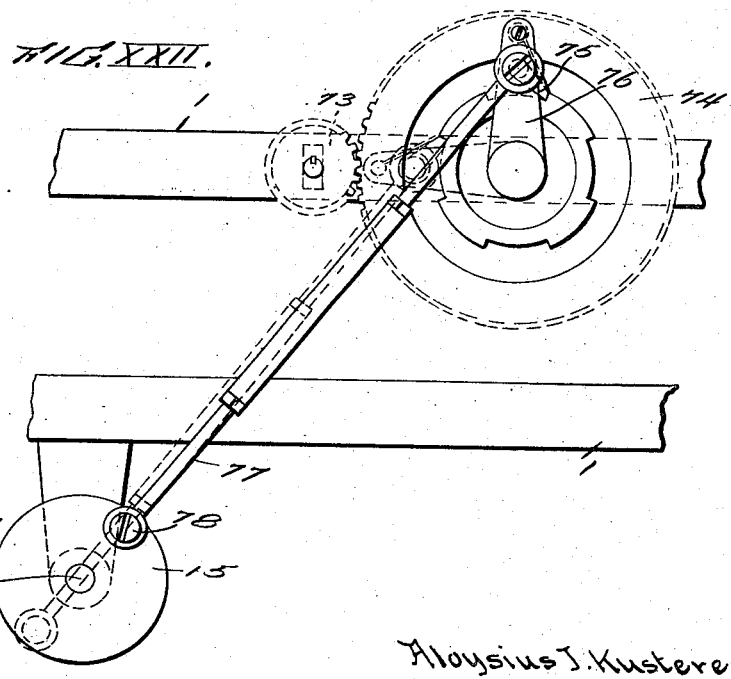
FIG. XXII.
Witnesses
Inventor
Aloysius J. Kusterer and
Charles Sanders,
By Mason Fenwick Lawrence,
Attorneys

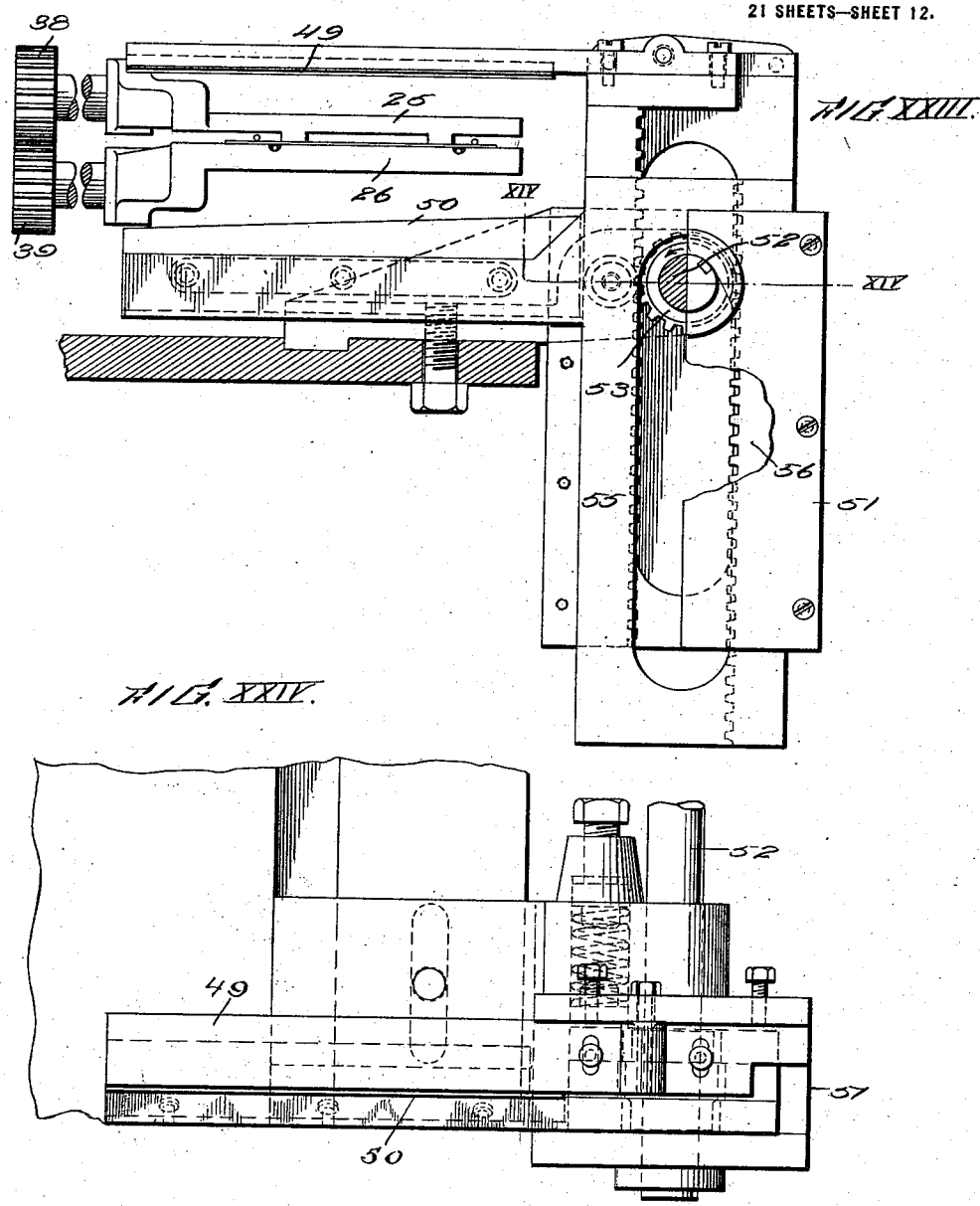

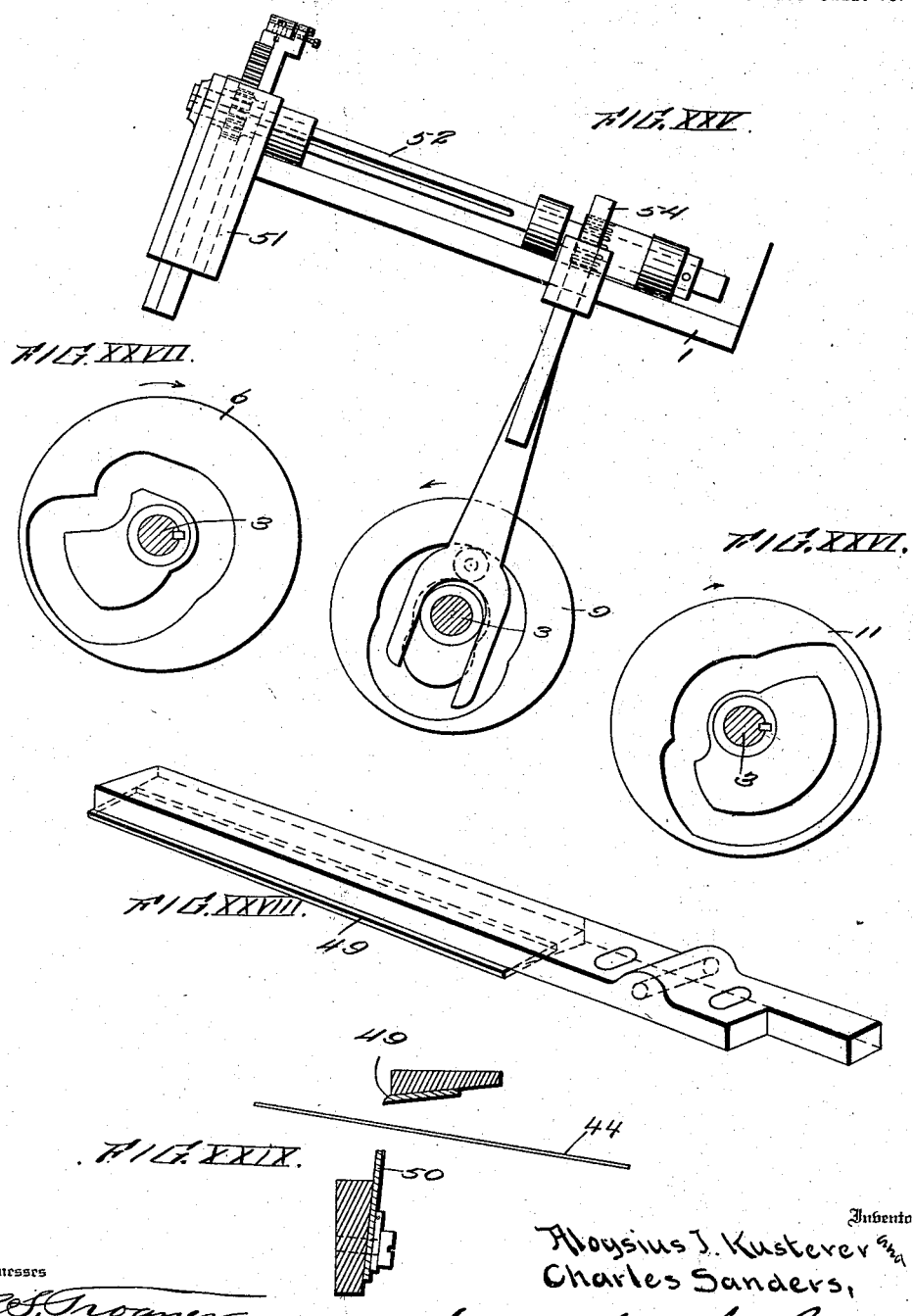

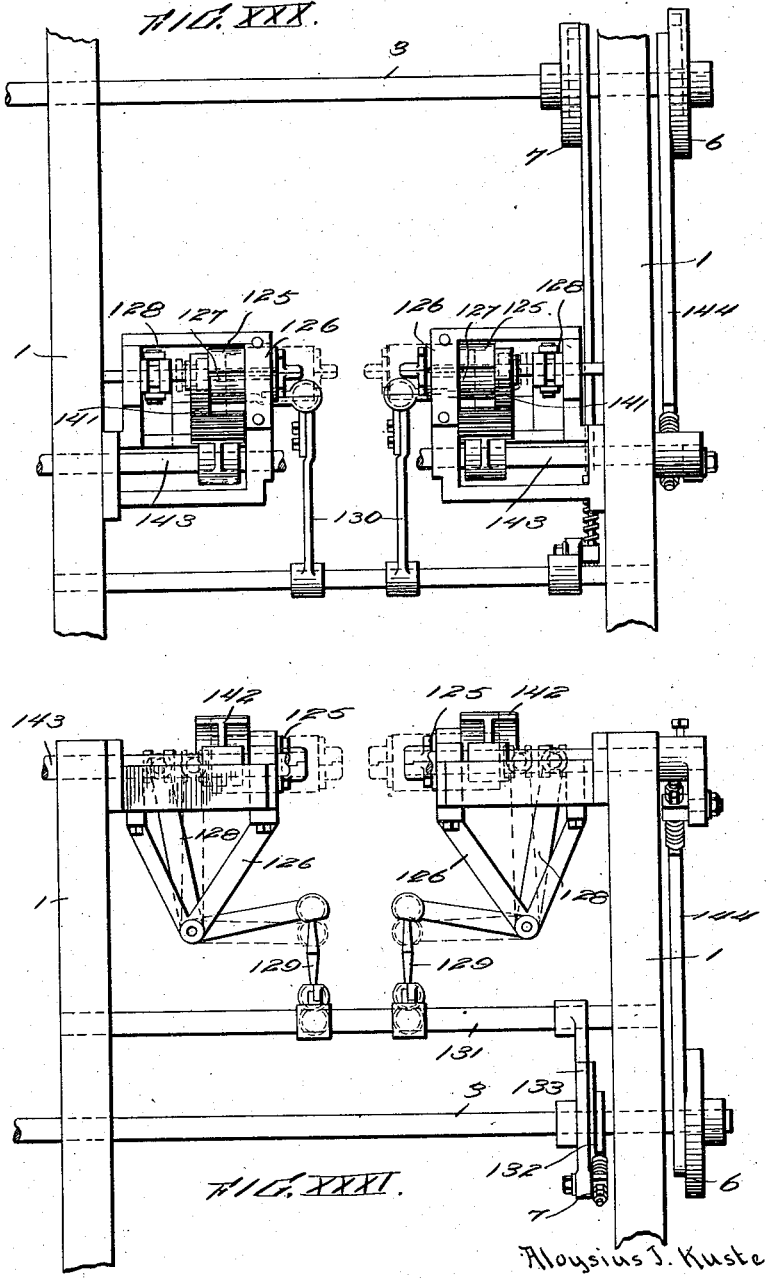

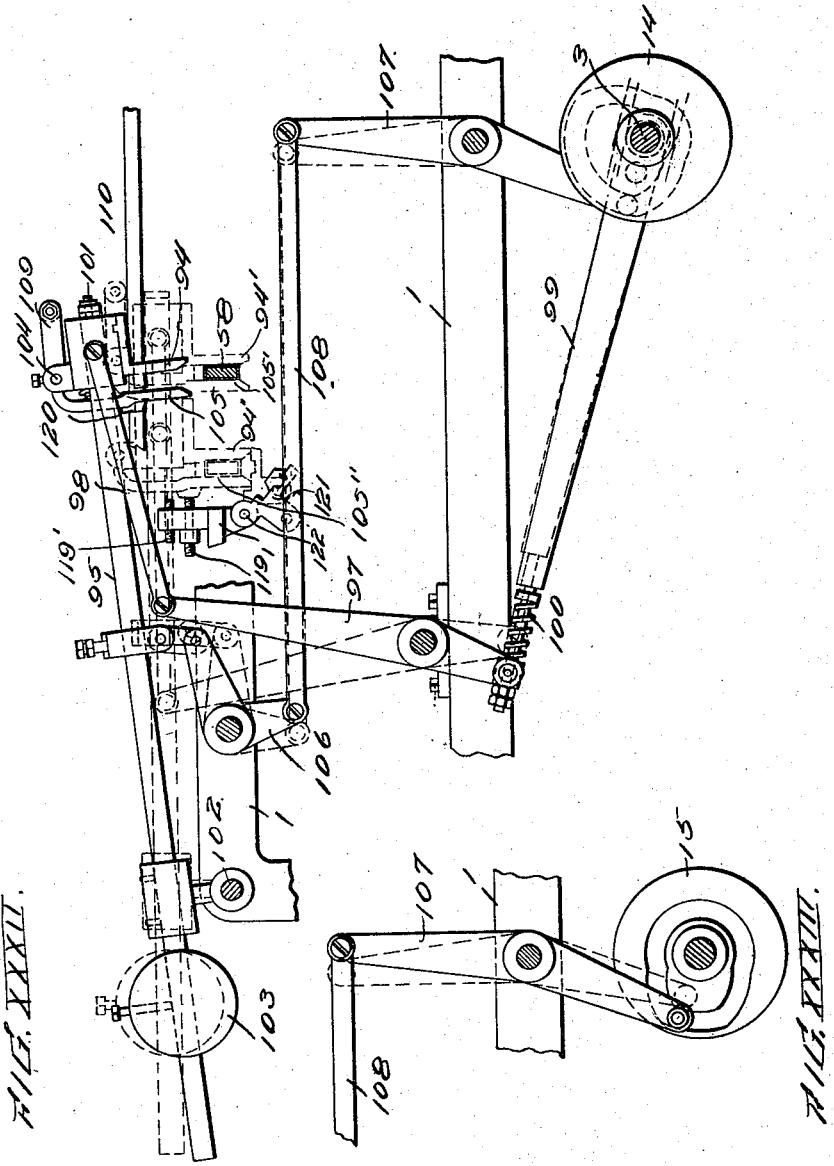

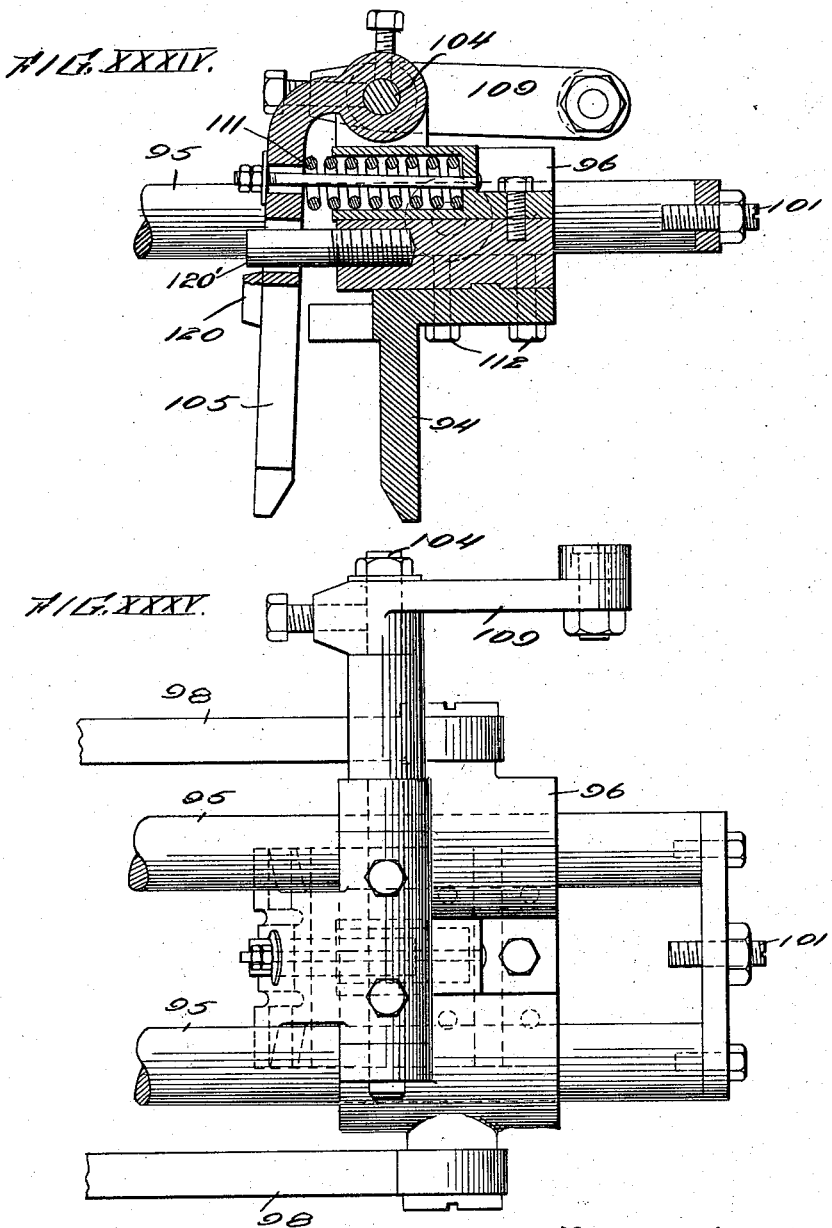

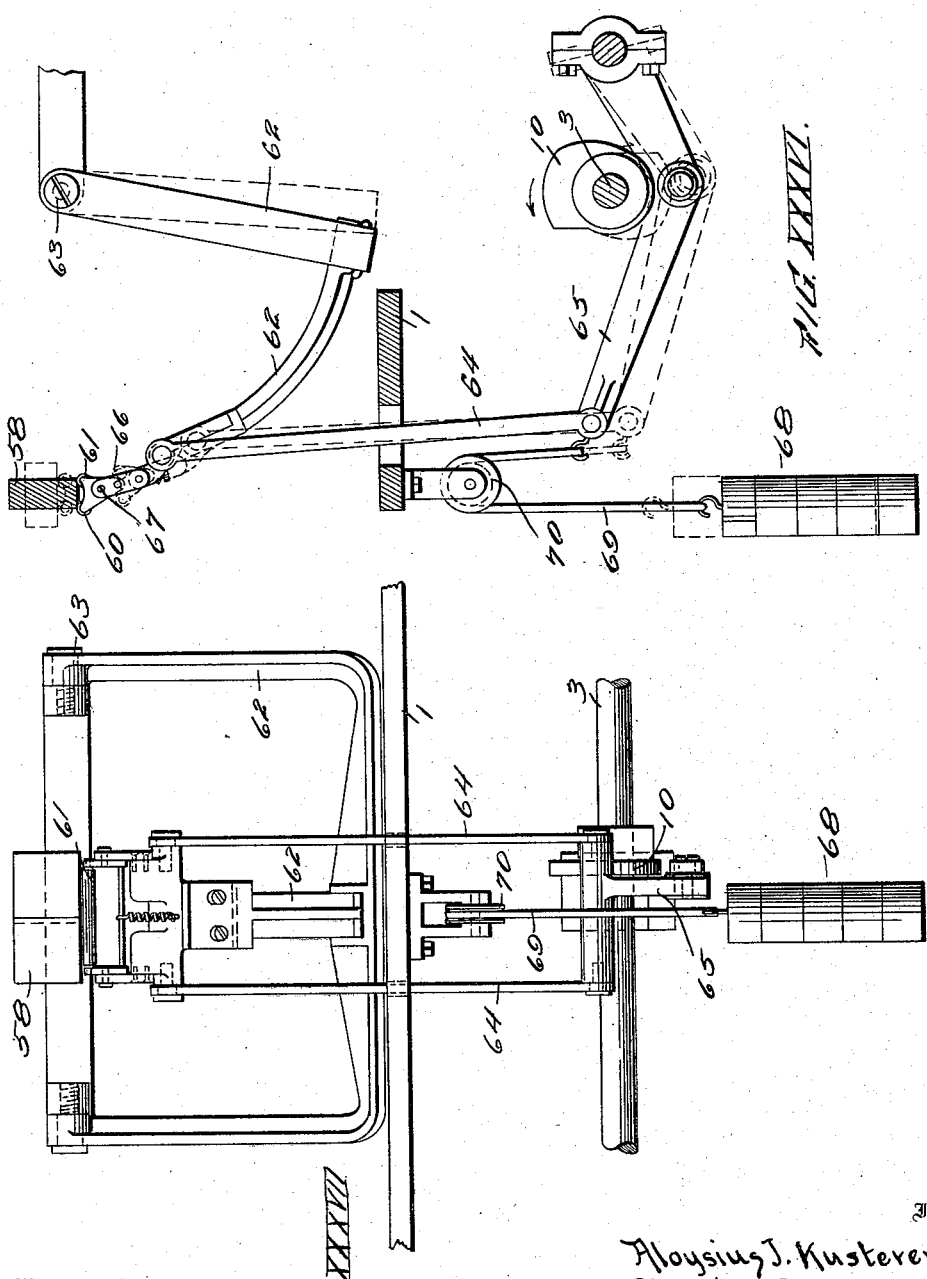

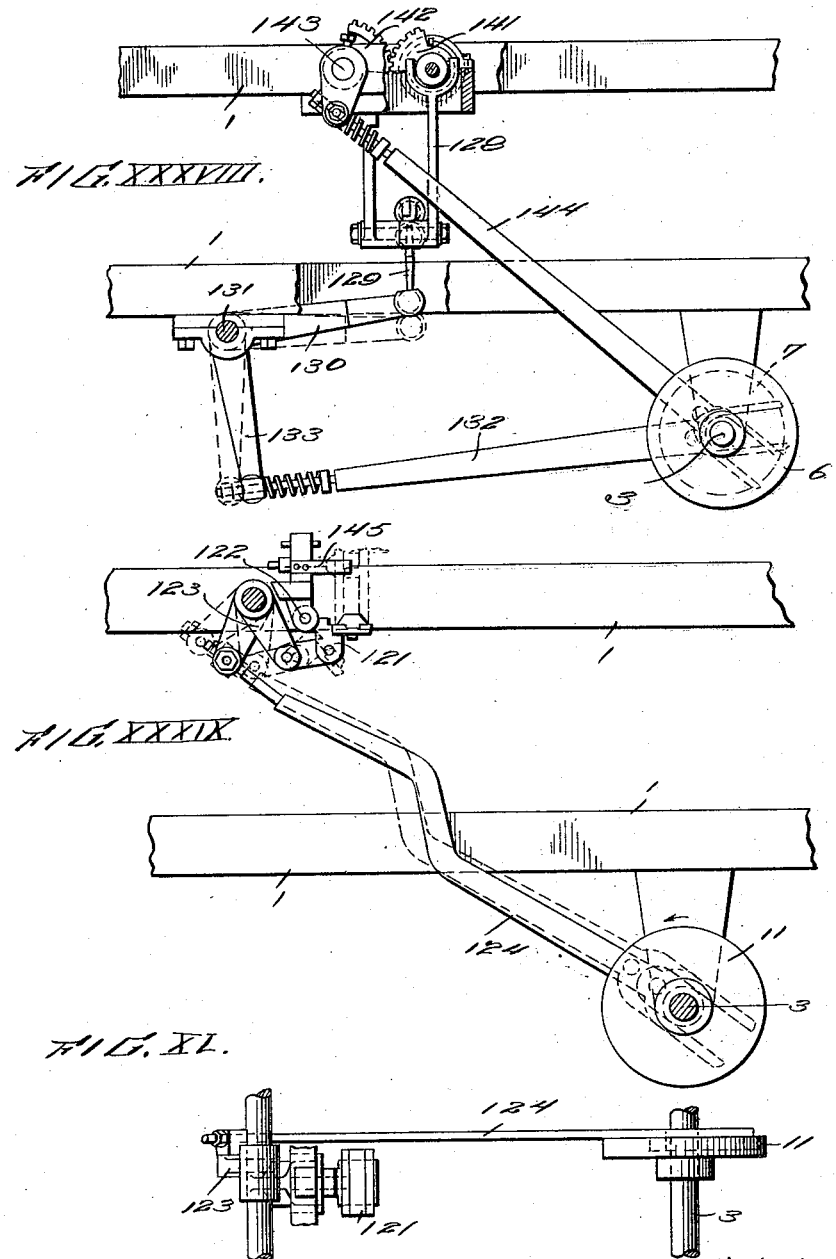

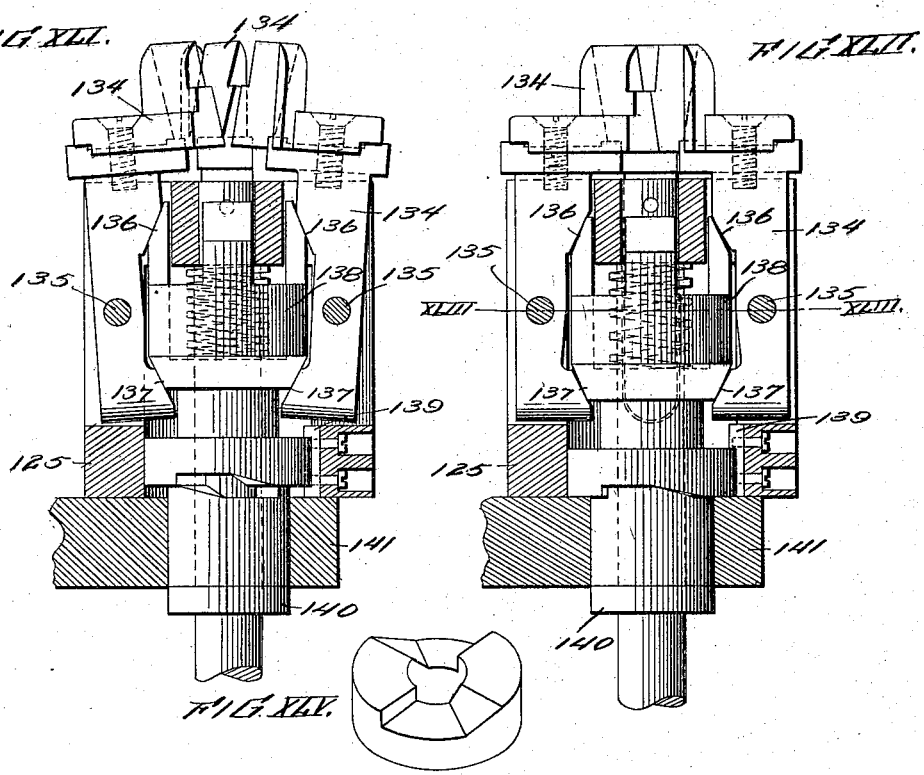

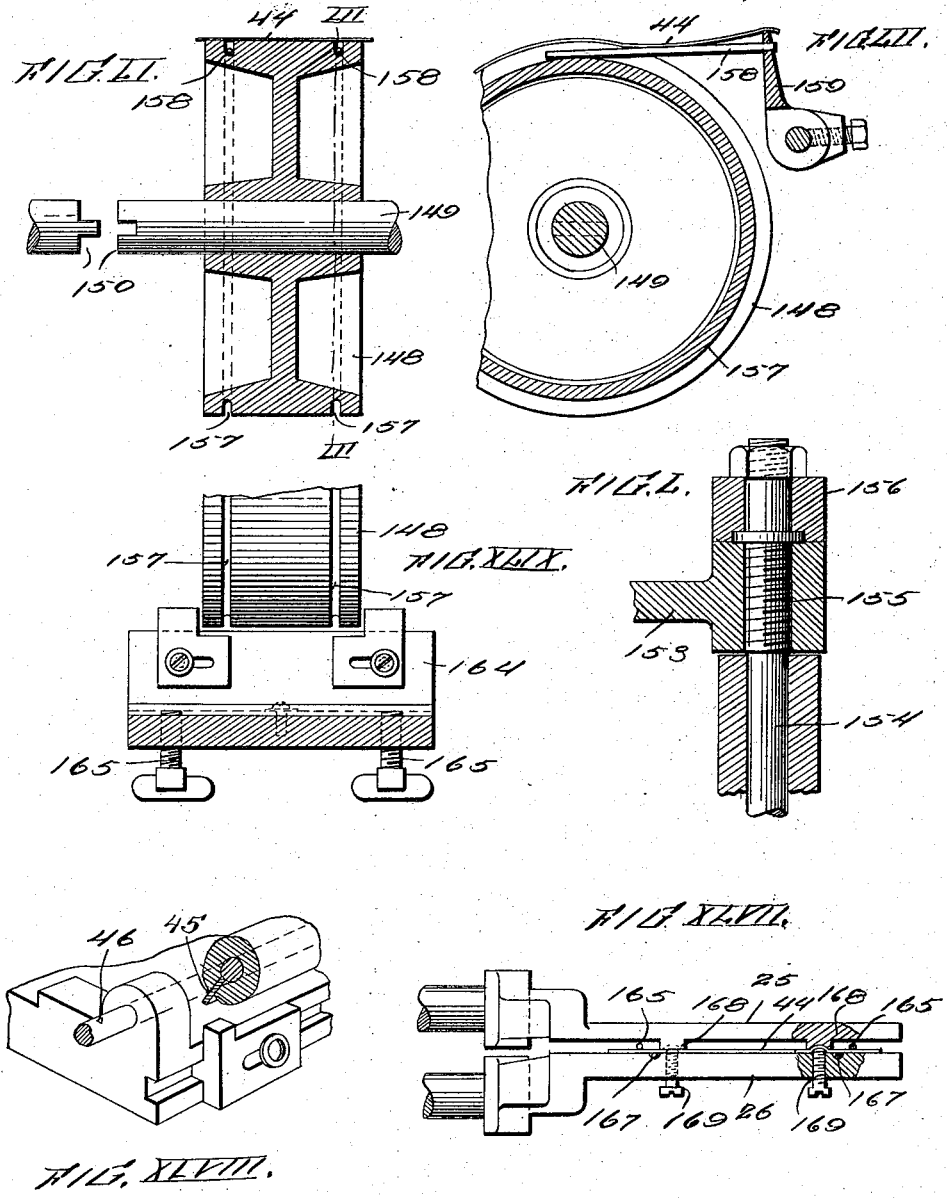

A. J. KUSTERER & C. SANDERS.
SHELL BOX MAKING MACHINE.
APPLICATION FILED AUG. 15, 1914.
1,218,417.
Patented Mar. 6, 1917.
21 SHEETS—SHEET 21.
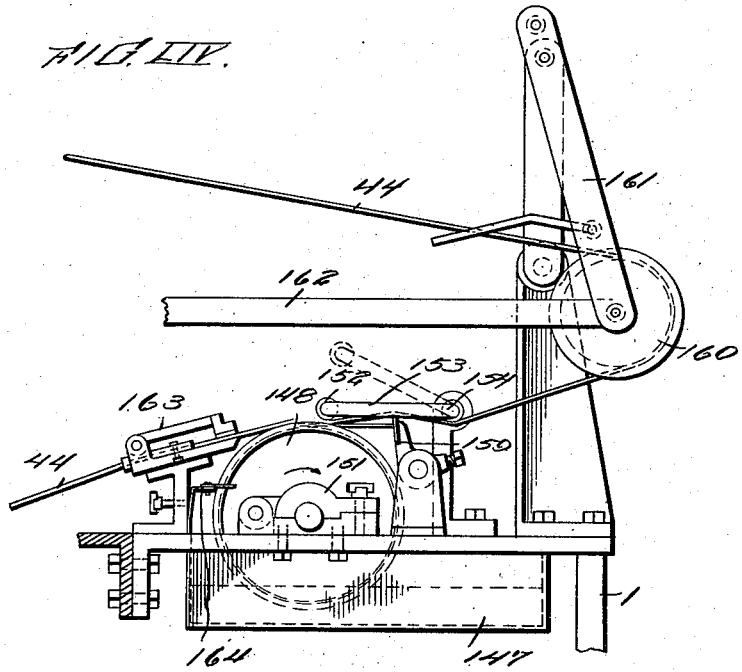
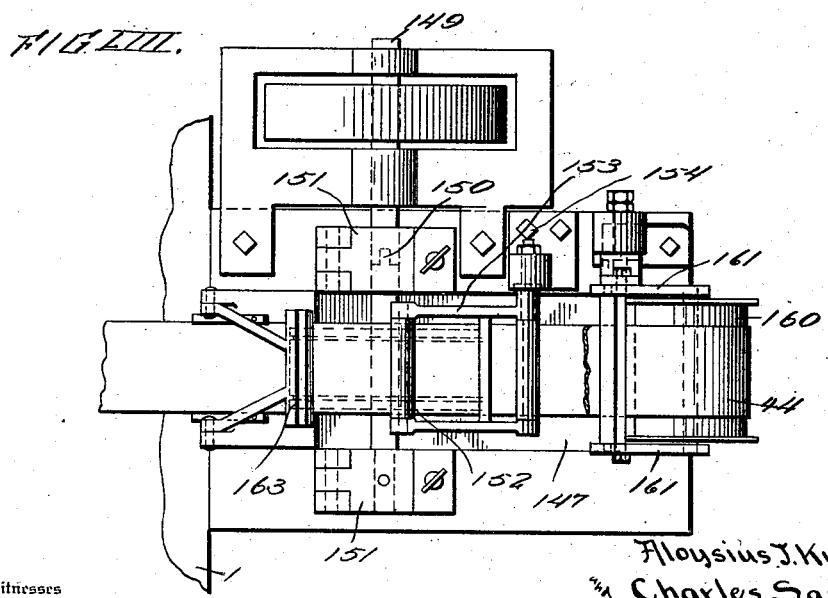

UNITED STATES PATENT OFFICE.

ALOYSIUS JOSEPH KUSTERER, OF RICHMOND, AND CHARLES SANDERS, OF SOUTH RICHMOND, VIRGINIA, ASSIGNORS TO THE RANDOLPH PAPER BOX CO., OF RICHMOND, VIRGINIA, A CORPORATION OF VIRGINIA.

SHELL-BOX-MAKING MACHINE.

1,218,417.   Specification of Letters Patent.   Patented Mar. 6, 1917.

Application filed August 15, 1914. Serial No. 856,991.

*To all whom it may concern:*

Be it known that we, ALOYSIUS JOSEPH KUSTERER, a citizen of the United States, residing at Richmond, in the county of Henrico and State of Virginia, and CHARLES SANDERS, a citizen of the United States, residing at South Richmond, in the county of Chesterfield and State of Virginia, have invented certain new and useful Improvements in Shell-Box-Making Machines; and we do hereby declare the following to be a full, clear, and exact description of the invention, such as will enable others skilled in the art to which it appertains to make and use the same.

This invention relates to box shell making machines and has for an object to provide new and improved means for automatically making and completing a box shell from a cardboard blank and from a web of cover paper.

A further object of the invention is to provide improved means for automatically feeding a cardboard blank and a section of cover paper to the forming mandrels with means for winding the superposed cardboard and paper about such mandrel and holding the formed shell in position while the outer extended edges of the cover paper are being folded inwardly within the shell.

A further object of the invention is to provide improved feed for the cover paper.

A further object of the invention is to provide improved shears for severing the required section of cover paper from the web.

A further object of the invention is to provide improved end lappers for folding in the extended edges of the cover paper within the cardboard shell.

A further object of the invention is to provide improved means for retaining the cardboard blanks in operative position.

A further object of the invention is to provide improved means for taking the formed shell from the mandrels and carrying it to position to be acted upon by the end lappers.

A further object of the invention is to provide improved pasting means for applying an adhesive to one side of the cover paper in its progress through the machine.

With these and other objects in view the invention comprises certain novel constructions, combinations and arrangement of parts, as will be hereinafter more fully described and claimed.

In the drawings:

Figure I is a view of the machine in side elevation, parts of the frame being broken away to prevent obscuring the operative parts.

Fig. II is a view of the machine in side elevation from the side opposite the view of Fig. I.

Fig. III is a view of the machine in top plan.

Fig. IV is a view of the machine in inverted plan.

Fig. V is an enlarged detail view in side elevation of the paper feeding device and the former mandrel.

Fig. VI is a diagrammatic view in side elevation of the paper feeding mechanism and operating parts.

Fig. VII is a view in detail of the mechanism for opening and closing the paper feed.

Fig. VIII is a view in detail of the paper supporting and guide mechanism.

Fig. IX is a top plan view of the former mandrel and operating parts.

Fig. X is a view in elevation of the former mandrels and operating parts.

Fig. XI is a sectional detail view of the former mandrels showing the manner of clamping the cardboard and cover paper upon the mandrel and of retaining it in such position.

Fig. XII is a detail plan view of the clamp for securing the paper and cardboard upon the former mandrels.

Fig. XIII is a detail view of the mechanism for clamping the cardboard and paper upon the mandrel shown in a second position.

Fig. XIV is a sectional view through the shear operating mechanism.

Fig. XV is an enlarged detail view of the former mandrel in side elevation.

Fig. XVI is a sectional view of the cams for operating the mandrel clamping mechanism.

Fig. XVII is a view of the cam in side elevation.

Fig. XVIII is a top plan view of the blank feeding mechanism.

Fig. XIX is a view in side elevation of the blank feeding mechanism.

Fig. XX is a transverse sectional view through the blank feeding mechanism taken on line XX—XX of Fig. XVIII.

Fig. XXI is a view of one of the former mandrels in end elevation with the complementary mandrel removed.

Fig. XXII is a view in edge elevation of the mandrel drive.

Fig. XXIII is a view in elevation of the shear, parts being broken away to show the racks and also showing section line XIV—XIV as the position of Fig. XIV.

Fig. XXIV is a top plan view of the shear mechanism shown at Fig. XXIII.

Fig. XXV is a view in detail of the shear operating mechanism.

Fig. XXVI is a view in side elevation of the cam for operating the mandrel door.

Fig. XXVII is a view in side elevation of the cam for producing the folding action of the end lappers.

Fig. XXVIII is a view in perspective of one of the shear members.

Fig. XXIX is a detail diagrammatic sectional view of the shears showing their position when permitting the paper feed to pass between the shear members.

Fig. XXX is a view in top plan of the end lappers and operating mechanism.

Fig. XXXI is a view of the end lappers and operating mechanism in side elevation, other structure being eliminated.

Fig. XXXII is a diagrammatic view of the shell clamping mechanism showing in dotted lines the movement of the shell from the mandrels to the end lappers.

Fig. XXXIII is a view in side elevation of the cam and lever for producing the oscillating movement of the shell clamping mechanism.

Fig. XXXIV is a detail sectional view of the shell clamping mechanism.

Fig. XXXV is a top plan view of the shell clamping mechanism.

Fig. XXXVI is a detail diagrammatic view of the mechanism employed for rolling the cardboard and paper about the mandrels.

Fig. XXXVII is a top plan view of the mechanism shown in detail at Fig. XXXVI.

Fig. XXXVIII is a detail view of the mechanism for operating the end lappers.

Fig. XXXIX is a detail view of the mechanism for opening and closing the door of the shell clamping mechanism.

Fig. XL is a top plan view of the mechanism shown at Fig. XXXIX.

Fig. XLI is a detail sectional view of one of the end lapper heads showing the jaws open.

Fig. XLII is a detail sectional view of one of the end lapper heads showing the jaws closed.

Fig. XLIII is a sectional view taken on line XLIII—XLIII of Fig. XLII.

Fig. XLIV is a view of one of the end lapper heads in end elevation with the jaws closed.

Fig. XLV is a view in perspective of one of the cams which open and close the jaws of the end lapper heads.

Fig. XLVI is a perspective view of one of the end lapper jaws showing the construction of the lapping extremity.

Fig. XLVII is a view in side elevation with parts broken away showing the paper clamping and feeding mechanism.

Fig. XLVIII is a fragmentary perspective view of the paper clamping device and adjustable guide.

Fig. XLIX is a top plan view of the pasting roll and scraper.

Fig. L is a detail sectional view of the mounting arm for the mechanism for holding the paper in operative contact with the pasting roll.

Fig. LI is a view in diametrical section of the pasting roll showing the strippers in position.

Fig. LII is a sectional view through the pasting roll taken on line LII—LII of Fig. LI.

Fig. LIII is a top plan view of the pasting mechanism.

Fig. LIV is a view of the pasting mechanism in side elevation.

Fig. LV (Sheet 4) is a perspective view of one of the shells as it leaves the mandrel with the cover paper extended and before it is folded in by the end lappers.

Fig. LVI is a perspective view of one of the completed shells with the cover paper folded in by the end lappers.

Fig. LVII (Sheet 9) is a perspective view of a fragment of the cardboard feeding apparatus.

Like characters of reference designate corresponding parts throughout the several views.

The shell machine which forms the subject-matter of this application comprises a frame 1 with a power shaft 2 with a cam shaft 3 intergeared therewith by the gears 4 as seen more particularly at Figs. III and IV. The drive shaft 2 is driven from any usual and ordinary source of power and by any usual and ordinary means, as by applying a belt to the pulley 5. The cam shaft 3 and the several cams 6, 7, 8, 9, 10, 11, 12, 13, 14 and 15 control the mechanism causing such various parts to operate in properly timed relation. Upon the frame is erected a magazine 16 proportioned to receive a stack of cardboard blanks, the said magazine being adjustable to receive blanks of various sizes by being composed of sections with slotted connection as shown at 17 in Fig. V and provided with feet 18 having slots 19 therein controlled by bolts 20 so that the magazine may be expanded in either dimension. In the base of the magazine, a cardboard feed reciprocates, said feed being shown particularly at Figs. XVIII, XIX, and XX comprising a base 21 having a plate 22 secured thereon, said plate being removable and replaceable and approximating the thickness of the cardboard blank to be fed so that as the member reciprocates the edge of the plate 22 engages the edge of the lowermost blank and moves it forward. The reciprocation of the feeding mechanism is produced by means of a jointed link 23 having a tension spring 24 connected therewith, as shown more particularly at Fig. V and operated from the paper feeding mechanism, which said paper feeding mechanism comprises jaws 25 and 26 pivoted upon a member 27 sliding in guides 28. The member 27 is reciprocated by means of a link 29 from a lever 30 fulcrumed at 31 and receiving motion from the cam 12 through the medium of a link 32 and lever 33 which latter lever is pivoted to the arm 34 which is directly actuated by such cam 12. At Fig. VI the reciprocating motion of the paper feed is clearly illustrated. The paper is carried upon a roll 35 and after passing over idlers 36 and 37 and the pasting mechanism, is threaded between and gripped by the jaws 25 and 26 during the forward reciprocation of such jaws, being released upon the return movement thereof, the releasing position being shown at Fig. V.

To cause the gripping action of the gripper jaws the pivots of said jaws 25 and 26 are provided respectively with pinions 38 and 39, best seen at Figs. VI and VII with an arm 40 rigidly connected with one of said pinions, as the pinion 39, and carrying a roller 41 bearing upon a rail 42, which said rail is raised and lowered by the contact of an arm 43 with the cam 13. The interaction of the cam 13 with the cam 12 causes a reciprocation of the jaws within the guides as before explained and an intermittent opening and closing of the jaws as just described.

As the jaws 25 and 26 reciprocate, therefore, they alternately grasp and advance the web 44 upon their forward movement and release such web upon their return movement. To prevent the web returning with the jaws a detent 45 is pivoted at 46 upon the frame, see Figs. V and XLVIII, carrying a weight 47 which tends to hold the detent in engagement with the web 44 but adapted to be lifted by an arm 48 carried rigidly by the shaft 31 so that the detent is lifted in timed relation to the advance of the web.

The jaws 25 and 26 are carried by a single set of arms, the jaws extending laterally at one side of said arms with a shear structure located at the side of the line of travel of said jaws opposite to said arms. The shear members 49 and 50 are adapted to separate to permit the jaws 25 and 26 to pass therebetween, the open position being shown at Fig. XXIX and the closed or severing position being shown at Fig. V, in the latter position the jaws being extended to the farthest limit of their movement and separated to release the web and the shear members being shown in position to sever a section from the web. The shear members are mounted by a block 51 carried rigidly mounted upon the frame with a shaft 52 extending into such block and carrying a pinion 53 and actuated by a rack 54 receiving motion from the cam 9, as shown more particularly at Fig. XXV. As the rack 54 is reciprocated by the action of the cam 9 the shaft 52 is oscillated upon its bearings and the pinion 53 engaging racks 55 and 56 upon its opposite sides causes such racks to move simultaneously in opposite directions. The shear member 49 is carried by the rack 55 while the shear member 50 is carried by the rack 56, so that the shear members 49 and 50 move simultaneously upwardly and downwardly or opening and closing upon the oscillation of the shaft 52. At Fig. XXIII the shear members 49 and 50 are shown opened to their limit with the jaws 25 and 26 therebetween showing the relation of the parts as the jaws 25 and 26 pass between such shear members. After the jaw members have passed between such shear members and to the position shown at Fig. V the shears close by the reverse movement of the pinion 53 and simultaneously the jaws open to release the section of the web which has been severed. As will be noted from Fig. V the section of the web severed has been moved into relation with the cardboard 57 and both have been advanced under the mandrel shown as a whole at 58. The mandrel 58 composed of two sections as shown more particularly at Figs. IX, X and XV is provided with tongue and groove connections as shown at 59 and is the exact size of the interior of the shell which is formed about such mandrel. As the web is fed under the mandrel as shown at Fig. V accompanied by the cardboard blank 57 it is clamped against such mandrel by means of rollers 60 and 61 carried by a yoke 62 pivoted at 63 and actuated by means of links 64 from cam 10 through the medium of the lever 65, as shown more particularly at Figs. XXXVI and XXXVII. The rollers 60 and 61 are connected with the yoke 62 by means of a spring arm 66 and pivoted to such arm as at 67 so that the said rollers 60 and 61 are capable of both bearing against the mandrel 58 at all times irrespective of the angular position of the mandrel, some of said angular positions being shown at Figs. V and XI with the rollers engaging such mandrel in both of such positions and in dotted lines at Fig. XXXVI a third position is also indicated. The rollers are held to position by weights 68 acting through the medium of a cable 69 over a pulley 70 but removed from such operative position by the operation of the cam 10 as indicated at Fig. XXXVI.

When the cardboard blank and the covering web are advanced into engagement with the mandrel as shown at Fig. V the rollers 60 and 61 are held away from the mandrel until the cardboard blank and cover paper are in position when the cam 10 permits the weight 68 to act and hold the rollers 60 and 61 with great force against the mandrel and hold such cardboard blank and cover paper in engagement and against the mandrel. It will be apparent that the web having passed over the pasting device is coated with an adhesive upon that side engaging the cardboard blank so that as the rollers hold such members against the mandrel they also assist in the adhesion of the blank and cover paper.

The sections of the mandrel are mounted upon shafts 71 and 72, the latter being the driven shaft and by reason of the tongue and groove connection between the sections of the mandrel both sections are driven together when the mandrel sections are in engagement. The shaft 72 is driven by means of a gear 73 from a gear 74 which is in turn driven with a step by step movement from a ratchet detent 75 carried upon a crank arm 76 journaled concentrically therewith and driven by a pitman 77 from a wristpin 78 carried by cam disk 15. As the shaft 3 rotates, therefore, the pitman 77 is given a reciprocatory movement as shown more particularly at Fig. XXII imparting to the crank arm 76 a quarter revolution and advancing the gear 74 a quarter turn at each revolution of the shaft 3. The relation of the gear 73 to the gear 74 is one to four so that the shaft 72 carrying the mandrel is rotated once for each quarter revolution or step movement of the gear 74.

When the cardboard blank and the cover paper are applied to the mandrel as shown at Fig. V the mandrel sections are in engagement or connected as shown at Figs. IX, X and XV. As the mandrel rotates, therefore, the combined blank and cover are carried about such mandrel and held in engagement therewith by the rollers 60 and 61. As the mandrel advances, however, the initial end of the combined blank engaging the mandrel is released and it is necessary to hold such blank in proper relation for the entire revolution of the mandrel. For such purpose fingers 79 are carried by blocks 80 which are mounted upon a shaft 81 controlled by a rack 82 engaging a pinion 83 also mounted upon said shaft 81. The rack 82 passes through a sleeve 84 which is carried by a crank arm 85, which said crank arm and other mechanism described are duplicated and carried upon the shafts 71 and 72 as shown more particularly at Figs. IX and X. The crank arms 85 are mounted to rotate with the shafts 71 and 72 by employing the feather 86 as shown more particularly at Figs. XII, XV, XVI and XVII but are held against longitudinal movement with such shafts 71 and 72 by the brackets 87 rigid with the frame 1 and engaging a sleeve 88 integral with the crank arms 85, such arrangement being shown more particularly at Figs. XVI and XVII. Also mounted upon the bracket is a cam hub 89, the latter being rigidly and immovably mounted. As will be noted especially from Figs. IX, X, XII and XVI the crank arm 85 rotates in contiguity to the cam hub 89 with the extremity of the rack 82 bearing against the cam face of such hub. A spring 90 is provided which tends to open the gripping fingers 79 to dotted line position shown at Fig. XII with the cam 89 holding such fingers in engagement with the mandrel 58 through certain predetermined arcs of the movement of the mandrel. The mandrel is provided upon its initial edge with a serrated corner 91, the serrations being inclined as shown more particularly at Fig. XV, such serrated corner being that over which the fingers 79 grip as shown at Fig. XI and serving to prevent any movement of the combined blanks upon such mandrels when held by the fingers as shown at said Fig. XI.

The gripping fingers 79 grip the blank upon the mandrel throughout the entire revolution of the mandrel except during that portion of the time when the blank is being introduced and gripped initially by the rollers 60 and 61. As shown at 92 at Figs. XI and XVII the rack 82 drops over the shoulder and permits the spring 90 to snap the gripping fingers to open position until they pass by the rollers 60 and 61 when it again engages the inclined face 93 and closes the gripping position, which gripping position it maintains until it again completes a revolution to the shoulder 92. It will thus be apparent that the combined blank and cover are held over the initial or serrated corner by the gripping fingers 79 until the rollers 60 and 61 have rolled the entire surface of the cover paper and lapped it over the final corner, such final position being shown at Fig. XI with the fingers 79 just in position to snap away from the mandrel as the cover paper has completely enveloped the cardboard blank surrounding the mandrel.

With, therefore, a complete revolution of the mandrel the cardboard blank 57 and paper 44 have been lapped entirely around such mandrel but the paper is wider than the cardboard blank so that the margins extend beyond the ends of the blank as shown particularly at Fig. LV. The mandrel being returned to a vertical position as shown at Figs. V and XXXVI the gripping fingers 79 and the rollers 60 and 61 are moved away from such mandrel leaving the shell still embracing the mandrel.

Following this step and while the shell is held upon the mandrel and free upon all sides the gripper jaws are brought down over and engage upon such shell. The gripper jaws and operating means are shown at Figs. XXXII to XXXV inclusive in detail. This comprises a jaw member 94 carried slidably upon arms 95 by means of a block 96 controlled by a lever 97 connected therewith by links 98 and receiving motion from cam 14 through the medium of pitman 99. A spring 100 is interposed in the run of the pitman 99 so that the forward movement of the block 96 and jaw 94 is made yieldable and the arms 95 carry an adjusting screw 101 positioned to be engaged by such block 96 at its forward movement. The arms 95 are pivoted at 102 with a counter-weight 103 adjustable thereon. Pivoted also upon the block 96 at 104 is a movable jaw 105 properly spaced from the jaw 94 to receive the shell between such jaws when the movable jaw is moved to closed position. The movable jaw is moved to closed position only when the clamping jaws are lowered to position to embrace the mandrel. The jaws are lowered by means of a bell-crank lever 106 connected with a lever 107 by a link 108 engaging cam 15 as shown particularly at Fig. XXXIII. By the actuation of the cam to actuate the bell-crank lever the jaw members are dropped from full line position in Fig. XXXII to dotted line position, at which position the jaws embrace mandrel 58 and the shell carried thereon and the movable jaw 105 is closed upon the shell by the arm 109 engaging the rail 110. A spring 111 as shown more particularly at Fig. XXXIV tends to open the movable jaw but when in lowered position and bearing upon the rail 110 the jaw is closed against the tension of such spring.

The fixed jaw 94 is made adjustable as will be noted from Fig. XXXIV by adjusting screws 112 and the interval between such jaws is adjusted to properly grip the shell upon the mandrel. At this point the sections of the mandrel are separated. This separation is brought about by bell-crank levers 113 engaging collars 114 carried rigidly upon the shafts 71 and 72 so that as said bell-crank levers are moved to dotted line position at Fig. X the mandrel sections are separated also as indicated at that figure in dotted lines. The action of the bell-crank levers 113 is brought about by arms 115 carried upon shaft 116 and connected with the bell-crank levers 113 by links 117 having ball and socket joints. The shaft 116 is oscillated by means of an arm 118 having engagement with the cam 8, such movement being shown at Figs. IX and X. The withdrawal of the sections of the mandrel leaves the shell grasped by the jaws 94 and 105, the frictional engagement of said jaws with the shell being sufficient to support it against displacement. The block 96 with the jaws attached is now moved along the arms 95 to the second dotted position shown at Fig. XXXII carrying the shell therewith. An adjusting screw 119 is positioned to be engaged by the face 120 of the movable jaw which accurately and positively positions the jaw in such rearward movement, while a pin 119' is also positioned to engage pin 120' carried by the block 96 to accurately position the combined jaws. A door 121 is pivoted at 122 and carries a block properly proportioned to engage between the extremities of the jaws 94 and 105 and to completely inclose the shell therein. The jaws 94 and 105 and the door 121 are the same width as the cardboard blank of the shell retained thereby with the margins of the cover paper extending beyond such clamping jaws. The door 121 is actuated by means of a bell-crank lever 123 from the cam 11 through the medium of a pitman 124 as shown more particularly at Figs. XXXIX and XL.

At its rearward limit of movement the clamping device brings the shell into position to be operated upon by the end lappers. The end lappers comprise similar heads 125 longitudinally slidable in brackets 126 but held against rotation by a feather in the groove 127. The heads are moved longitudinally by means of bell-crank levers 128, links 129 and arms 130 carried upon shaft 131 which is rocked by means of a pitman 132 and lever 133 from the cam 7. The lapper heads 125, therefore, alternately approach and recede from the shell held by the gripper jaws although such advancing and receding is not constant as will be hereinafter more fully explained.

At Figs. XLI to XLVI inclusive the detail of the lapper heads is shown. Each head comprises four jaws 134 pivoted at 135 and having cam faces 136 and 137 engaged by a cam 138 slidable between such jaws and opening or closing the jaws according to the position of the cam as indicated at Figs. XLI and XLII. The cam 138 is also held against rotation by means of a feather 139 and is longitudinally moved by a second cam 140 rigidly connected with a segmental gear 141 and as the head is held against rotation it is obvious that if the segmental gear 141 is rotatably moved it will serve to rotate the cam 140 against the face of the cam 138 thereby producing longitudinal movement of the latter. Movement of the segmental gear 141 is produced by intergearing such segments with a wide faced segment 142 carried upon shaft 143 which in turn is oscillated by the pitman 144 from the cam 6.

When the shell carried by the grippers is moved into position to be acted upon by the end lappers the heads are moved toward the shell with the jaws expanded as shown at Fig. XLI, the area of such expansion being greater than the area of the shell so that the extended margins of the paper are received within the area of the jaws and the head is moved until the jaws reach substantially the line of the end of the cardboard foundation. At this position the cam 6 acts to close the jaws so that the exterior surfaces of such jaws cover an area slightly less than the interior of the shell whereupon the jaws are again moved inwardly and the extremities of the jaws are expanded slightly to press the gummed paper into engagement with the interior of the cardboard foundation to insure proper adhesion of such paper to the shell. The jaws are again contracted to an area slightly smaller than the interior of the shell and are again withdrawn by moving the heads longitudinally. This effects the turning in of the margins of the covering paper as shown at Fig. LVI.

The door 121 is now dropped to permit the shell to be discharged from between the jaws 94 and 105 and the stripper fingers 145 which have been inserted between the fingers of the movable jaw 105 being permanently mounted, as the arms 95, block 96 and jaws rise serve to discharge the completed shell from upon the jaws 94 and 105 into a conveyer 146.

The pasting device which has heretofore been referred to in its entirety comprises a receptacle 147 in which the pasting roller 148 is rotated in any approved manner as from the shaft 149. The shaft 149 is preferably constructed in sections with interlocking parts as shown at 150 so that the paste roller may be readily removed from the receptacle 147 by opening the hinged bearing blocks 151. The paper web 44 is held in engagement with the pasting roller 148 by a roller 152 carried upon a frame 153. The frame 153 is pivoted upon a rod 154 in such manner that when the frame 153 is raised it remains in such raised position until manually depressed whereupon it is free to ride upon the paper held only by the weight of the roller and the frame. The binding of the frame in the raised position is accomplished by providing the rod 154 with screw threads 155 as shown at Fig. L and threading the sleeve of the frame 153 where it engages upon such rod so that when the frame is lifted the hub of the frame binds against the bracket 156 but when in lowered position is as above described, free to oscillate without any binding action. The paste roller is provided with grooves 157 and wires 158 are carried by the supporting member 159 to strip the paper 44 from the paste roller as it passes to the idler 160. This idler 160 is journaled upon a frame 161 connected with the lever 30 by means of a link 162 so that the idler 160 swings upon its frame in unison with the paper feeding and serves as a take-up of the slack and to equalize the take-off from the roll.

Before the paper passes upon the pasting roll 148 a tension device 163 engages with the paper serving to hold the paper to a more uniform feeding and also to hold it in contact with the surface of the pasting roller 148. A scraper 164 is also located adjacent the pasting roller and adjustable by means of screws as shown.

To prevent the pasted paper from adhering to the shear members, wires 165 are carried by an arm 166 and other wires 167 are secured to the face of the paper chute shown at Fig. V and the jaw 25 is provided with lugs 168 which permit the wires 165 to slide between such jaws and the paper while the jaw 26 is provided with grooves to accommodate the wires 167 all as shown at Fig. XLVII. The jaw 26 is also provided with set screws 169 and the lugs 168 of the jaw 25 are provided with depressions to fit over the extremities of said set screws to insure the proper gripping of the paper between such jaws. As shown at Fig. 5, the paper web 44 extends upon the wires 165 and 167 and the jaws 25 and 26 when they return to withdrawn position grip the paper where it is engaged upon these wires with the extremity of the paper extending beyond the jaws so that it is obvious it is in position to be engaged between the rollers 60 and 61 and the mandrel 58.

To adapt the cardboard feed to deliver only a single blank but of varying thickness a lever 170 is pivoted upon the side of the magazine 16 as shown more particularly at Fig. LVII having a finger 171 hooked about the front of said magazine and depending adjacent the base 1. The lower end of the finger is adjusted from the base 1 a sufficient distance to permit the passage of a single blank only beneath such finger, such adjustment being by way of a screw 172 engaging against a pin 173 inserted through a slot 174 in such lever. The lever is also held to position by a spring 175. A guide 176 is also positioned to engage the edge of the blank 57 as it is ejected from the magazine by the ejector 22 thereby giving the cardboard blank the proper initial direction. A finger 177 is also provided which may be engaged manually to raise the lever 170 to relieve choking.

It is believed that the operation of the machine to complete a shell has been so fully and completely described in the description of the structure that further description of the operation of the machine will be unnecessary to a complete understanding of such operation.

We claim:

1. In a shell making machine, a rotary separable mandrel; means to feed material to the mandrel; means to retain the material upon the mandrel as the mandrel rotates; a clamping jaw structure proportioned to clamp the material formed upon the mandrel; means to withdraw the sections of the mandrel from the material held by the clamping jaws; and means to strip the material from the jaws.

2. In a shell making machine, a rotary mandrel composed of separable sections; means to feed a cardboard blank and a paper cover simultaneously to the mandrel; means to wipe the combined material about the mandrel; a clamping member adapted to engage the formed material about the mandrel; means to withdraw the sections of the mandrel from the formed material; and means to effect the release of the formed material from the clamping member.

3. In a shell making machine, a mandrel; means to feed a cardboard blank and a strip of gummed paper to the mandrel simultaneously; means to wipe the combined material about the mandrel; means to grasp the formed material upon the mandrel and maintain it against movement; means to withdraw the mandrel from the formed material while so held; means to turn the extended ends of the gummed paper within the formed blank; and means to discharge the completed article from the grasping means.

4. In a shell making machine, a mandrel; means to wipe a combined cardboard blank and paper cover about the mandrel, said paper cover extending beyond the end of the cardboard blank; means to maintain the formed blank against movement and withdraw the mandrel therefrom; means to move the released formed blank and support the same in a new position; and jaws arranged to engage the extended end of the paper and fold it within the end of the formed blank.

5. In a shell making machine, a mandrel; means to wipe a combined cardboard blank and wider paper cover about the mandrel with the margin of the paper extending beyond the end of the formed blank; and an end lapper movable toward and from the formed blank and provided with jaws proportioned to engage upon the exterior of the extended end of the paper and insert such extended end within the cardboard blank; and means to expand the jaws to cause the paper to adhere to the interior of the formed blank.

6. In a shell making machine, a rotatable mandrel comprising separable sections; a plurality of rollers positioned to engage against the mandrel in all rotary positions; fingers adapted to engage one corner of the mandrel; means to hold such fingers in such engagement throughout a predetermined arc of rotation of the mandrel; and means to release the fingers from such engagement during the remaining arc of rotation of the mandrel.

7. In a shell making machine, a rotary mandrel comprising separable sections having one serrated corner with the serrations inclined toward the middle; means to hold a blank against the mandrel throughout its cycle of rotation; fingers pivoted adjacent the mandrel and adapted at times to engage against the serrated corner; a cam; means connecting the cam with the fingers adapted to hold the fingers in engaging position throughout a predetermined arc of rotation; and means to withdraw the fingers from such engagement throughout the remaining arc of rotation.

8. In a shell making machine, a mandrel; a magazine located adjacent the mandrel; a web of paper terminating adjacent the mandrel; means to remove a blank from the magazine and conduct it to the mandrel; grippers slidable along the path of travel of the paper web; means to close the gripper fingers upon the paper web at one extremity of their movement and to move the paper web into engagement with the mandrel; and means to sever that portion of the paper web held by the grippers.

9. In a shell making machine, means to support a web of paper; a pasting mechanism; means to move the paper web over the pasting mechanism; a reciprocating paper feed; jaws carried by the paper feed and adapted to engage the web of paper at one limit of movement and release it at the opposite limit of movement; and a detent bearing upon the paper web adapted to prevent return movement of the web.

10. In a shell making machine, a mandrel; means to wipe a sheet around the mandrel; arms pivoted adjacent the mandrel; means to raise and lower the arms; a block slidable upon the arms; means to slide the block along the arms; jaws carried by the block; operating means timed to lower the jaws about the mandrel to withdraw the mandrel and slide the block along the arms; and a door engaged with the jaws at such latter position completing the embracing of the article removed from the mandrel.

11. In a shell making machine, a mandrel; means to wipe a sheet about the mandrel; arms pivoted adjacent the mandrel; means to raise and lower the arms; a jaw head slidable upon the arms; means to move the jaw head slidably upon the arms; actuating means timed to lower the jaw heads to engage the article upon the mandrel to withdraw the mandrel and move the jaw head along the arms; and a movable member positioned to interact with the jaw at the latter limit of movement to inclose the article removed from the mandrel upon four sides.

12. In a shell making machine, means to hold a partially completed shell with a gummed paper cover extending beyond the end of an interposed foundation; lapper heads movable toward and from the holding means; jaws carried by the lapper heads and movable to increase and decrease the area of the jaw extremities; means including reciprocating cams to expand the jaws and move them toward the shell to embrace the extended paper margins; means to contract the jaws until the external area is less than the internal area of the shell; means to insert the jaws within the shell; means acting upon said expanding means to again expand the jaws to insure adhesion of the margin to the interior of the shell; means acting upon said contracting means to again contract the jaws; and means to withdraw the jaws from the shell.

13. In a shell making machine, means to hold a partially completed shell with a gummed paper margin extending beyond the extremity of an interposed foundation; a lapper head movable toward and from the holding means; jaws pivotally mounted upon the lapper head and movable to increase and decrease the area of such jaw extremities; a cam mounted within the head adapted to move the jaws; a second cam adapted when moved rotatably to actuate the first mentioned cam; a gear carried by the rotatable cam; and means to impart rotative motion to the gear.

14. In a shell making machine, means to hold a partially completed shell with a paper cover having its margin extending beyond the extremity of an interposed foundation; a lapper head longitudinally movable along the axis of the shell; jaws carried by the lapper head and corresponding substantially with the outline of the end of the shell; means including reciprocating cams to expand the jaws to an area greater than the shell and to move such head toward the shell with the jaws engaging the exterior of the paper margin; means to contract the jaws to an area less than the internal area of the shell and to contract the paper margin therewith; means to insert the jaws within the shell and to carry the paper margin within the shell; means acting upon said expanding means to again expand the jaws to wipe the paper margin upon the interior of the shell; means acting upon said contracting means to again contract the jaws; and means to move the lapper head in reverse direction along its axis.

15. In a shell making machine, a lapper comprising a head having jaws pivoted thereon; a cam longitudinally movable within the head and engaging cam surfaces of the jaws; means to move the cam longitudinally to alternately open and close the jaws; a rotatable cam adapted to move the first mentioned cam longitudinally; and means to rotate the rotatable cam.

16. In a shell forming machine, a rotary mandrel composed of separable sections, means to feed a cardboard blank and a paper cover simultaneously to the mandrel, means to wipe the combined material about the mandrel, resilient means engaging the material while on the mandrel during part of its rotation, means for grasping the material, means acting simultaneously with said grasping means to separate the sections of the mandrel whereby to withdraw the same from the material, means co-acting with said grasping means to embrace the material, lappers operating within the ends of the blank, means for operating said lappers to force the edges of the cover within the blank, and means acting upon said lappers to press said edges against the inner walls of the blank.

17. In a shell forming machine, a rotary mandrel including separable sections, means for supplying a sheet of cardboard and a paper cover simultaneously to the mandrel, means to wipe the material about the mandrel, resilient members, means for holding said members in engagement with the material on the mandrel during a part of its rotation, jaws for grasping the material on the mandrel, means for withdrawing the mandrel from the material, means co-acting with said jaws to support the said material, means for folding the ends of the paper cover within the blank, and means for causing the release of the material from the jaws.

18. In a shell forming machine, a rotary mandrel including separable sections, means for supplying a sheet of cardboard and a paper cover simultaneously to the mandrel, means to wipe the material about the mandrel, resilient members contacting with the material to support the same on the mandrel during a part of its rotation, jaws for grasping the material on the mandrel, means for withdrawing the mandrel from the material, a pivoted member operating between the jaws and co-acting with the same to support the material means for folding the ends of the upper cover within the blank, and means for actuating said pivoted member to release the shell from the jaws.

In testimony whereof, we affix our signatures in the presence of two witnesses.

ALOYSIUS JOSEPH KUSTERER.
CHARLES SANDERS.

Witnesses:
CLIFFORD LEE WEISIGER,
NORMAN VINCENT CAVANAUGH.

Copies of this patent may be obtained for five cents each, by addressing the "Commissioner of Patents, Washington, D. C."